United States Patent

Butz

[11] Patent Number: 5,971,409
[45] Date of Patent: Oct. 26, 1999

[54] CARRYING CASE ADAPTED FOR USE WITH A GOLF PULL CART

[76] Inventor: Byron N. Butz, 423 Delaware Ave., Lansdale, Pa. 19446

[21] Appl. No.: 09/020,639

[22] Filed: Feb. 9, 1998

[51] Int. Cl.$^6$ ..................................................... B62B 1/00
[52] U.S. Cl. ............................................................ 280/47.26
[58] Field of Search ........................... 280/DIG. 6, 47.26; 206/315.3

[56] References Cited

U.S. PATENT DOCUMENTS

| | | | |
|---|---|---|---|
| 3,144,014 | 8/1964 | Mantell, Jr. | 126/38 |
| 4,383,563 | 5/1983 | Kirchhoff, Jr. | 150/1.5 R |
| 4,759,559 | 7/1988 | Moulton | 280/40 |
| 5,265,894 | 11/1993 | Dunn | 280/47.26 |
| 5,429,290 | 7/1995 | Green, Jr. | 224/274 |
| 5,435,581 | 7/1995 | Reiling | 280/30 |
| 5,472,084 | 12/1995 | Aliano, Jr. | 206/315.3 |
| 5,524,737 | 6/1996 | Wang | 190/18 A |
| 5,590,748 | 1/1997 | Chang | 190/18 A |
| 5,632,496 | 5/1997 | Nelson | 280/30 |
| 5,725,351 | 3/1998 | Guibert et al. | 414/646 |
| 5,797,612 | 8/1998 | Buccioni | 280/47.26 |
| 5,868,247 | 2/1999 | Schrader | 206/315.4 |

FOREIGN PATENT DOCUMENTS

| | | | |
|---|---|---|---|
| 450982 | 9/1948 | Canada | 280/DIG. 6 |
| 519351 | 12/1955 | Canada | 280/38 |
| 1200909 | 12/1959 | France | 280/DIG. 6 |
| 2635-689 | 3/1990 | France | 280/DIG. 6 |
| 2528-968 | 1/1976 | Germany | 280/DIG. 6 |
| 630225 | 5/1947 | United Kingdom | 280/DIG. 6 |

OTHER PUBLICATIONS

Washington Daily News, Friday, Feb. 5, 1965.

*Primary Examiner*—Robert J. Oberleitner
*Assistant Examiner*—Daniel Yeagley
*Attorney, Agent, or Firm*—LaMorte & Associates

[57] ABSTRACT

A carrying case for use with a golf pull cart of the type that includes a frame element, an lower support disposed at the bottom of the frame element and an upper support disposed proximate the top of the frame element. The carrying case includes a main compartment having a top end and a bottom end. An access opening extends from a point proximate the top end to a point proximate the bottom end. A generally cylindrical section extends below the main compartment. The generally cylindrical section is sized to engage the lower support on the golf pull cart. Similarly, a top section extends above the main compartment. The top section is sized to engage the upper support on the golf pull cart. The carrying case has a large volume and can be used to carry items of can be converted into a child's seat. Accordingly, the present inventions enables a common golf pull cart to be selectively converted into a travel cart and/or a stroller.

18 Claims, 4 Drawing Sheets

5,971,409

CARRYING CASE ADAPTED FOR USE WITH A GOLF PULL CART

BACKGROUND OF THE INVENTION

1. Field of the Invention

The present invention relates to carrying cases, luggage, and other such containers that are used by people to carry their possessions when traveling by foot. More particularly, the present invention relates to carrying cases and similar items that are adapted to be joined to wheeled carts.

2. Prior Art Statement

People who travel to vacation destinations often spend a great mount of time touring that vacation destination on foot. For example, if a person travels to an amusement park or a museum, the entire time at such a destination is spent walking from one attraction to another. When people travel on vacation, they often carry a substantial amount of equipment with them. The equipment that is carried typically includes cameras, food, water, rain gear, sun tanning lotions and the like. If people are travelling with children, the amount of materials that must be carried while walking increases dramatically. Items such as diaper bags, strollers, bottles and the like must now be carried. Likewise, if a vacation is taken at the beach, yet additional equipment must be carried. Such equipment includes beach chairs, umbrellas, playpens, towels blankets and the like.

In the prior art there have been a large number of devices that have been invented to assist people carry a large amount of equipment as they walk. Such prior art devices commonly fall into the categories of backpacks, carry bags or pull carts. Backpacks and carry bags are uncomfortable to carry for long distances. Furthermore, backpacks and carry bags do require a certain degree of physical fitness to use. Accordingly, such devices are not preferred by vacationers who want to casually stroll around a vacation destination without a great deal of effort.

The preferred choice of vacationers for carrying equipment while walking is a cart or stroller. Carts and strollers can hold a large amount of equipment yet can be pulled by a walking person with only a minimum of effort. In the prior art, there are many different types of carts and strollers that are intended for different purposes. For example, U.S. Pat. No. 5,362,079 to Graham, entitled Beach Caddy, shows a cart adapted to carry the equipment commonly carried to the beach. U.S. Pat. No. 4,118,048 to Spranger, entitled Wheeled Sample Case shows a cart adapted to carry a large number of sales samples. The problem associated with such prior art carts is that they are designed only to hold certain items. As such, a person would have to purchase one cart to carry beach equipment, another to carry a child and yet another to carry bulky items such as ice chests.

A need therefore exists for a cart that can be adapted to multiple uses and can be used to hold, children and/or the equipment needed for numerous different situations. This need is met by the present invention as described and claimed below.

SUMMARY OF THE INVENTION

The present invention is a carrying case for use with a golf pull cart of the type that includes a frame element, an annular support disposed at the bottom of the frame element and a semicircular support disposed proximate the top of the frame element. The carrying case includes a main compartment having a top end and a bottom end. An access opening extends from a point proximate the top end to a point proximate the bottom end. A generally cylindrical section extends below the main compartment. The generally cylindrical section is sized to fit within the annular support on the golf pull cart. Similarly, a top section extends above the main compartment. The top section is sized to fit within the semicircular support on the golf pull cart.

The carrying case has a large volume and can be used to carry items or can be converted into a child's seat. Accordingly, the present inventions enables a common golf pull cart to be selectively converted into a travel cart and/or a stroller.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

As people vacation, a common item brought with them are their golf clubs. In many instances, people who own golf clubs also own golf bag pull carts. Golf bag pull carts are portable carts that are specifically designed to hold the shape of a golf bag. Such pull carts are typically both lightweight and collapsible so they can be easily transported. Furthermore, such carts typically are very sturdy in order to hold the full weight of a loaded golf bag as it travels over rough terrain. Lastly, such pull carts are well balanced on large wheels so that the carts are easy to maneuver and pull even when loaded with a significant amount of weight. The present invention is a carrying case that is designed to be carried by a conventional golf pull cart. Such a carrying case is shaped to hold a wide range of equipment. Consequently, a person's golf cart can be transformed into a pull cart for use at the beach, an amusement park or any other place that is toured by walking. As a result, a strong, light-weight pull cart can be had without the need for purchasing separate pull carts for separate applications.

Figure 1:
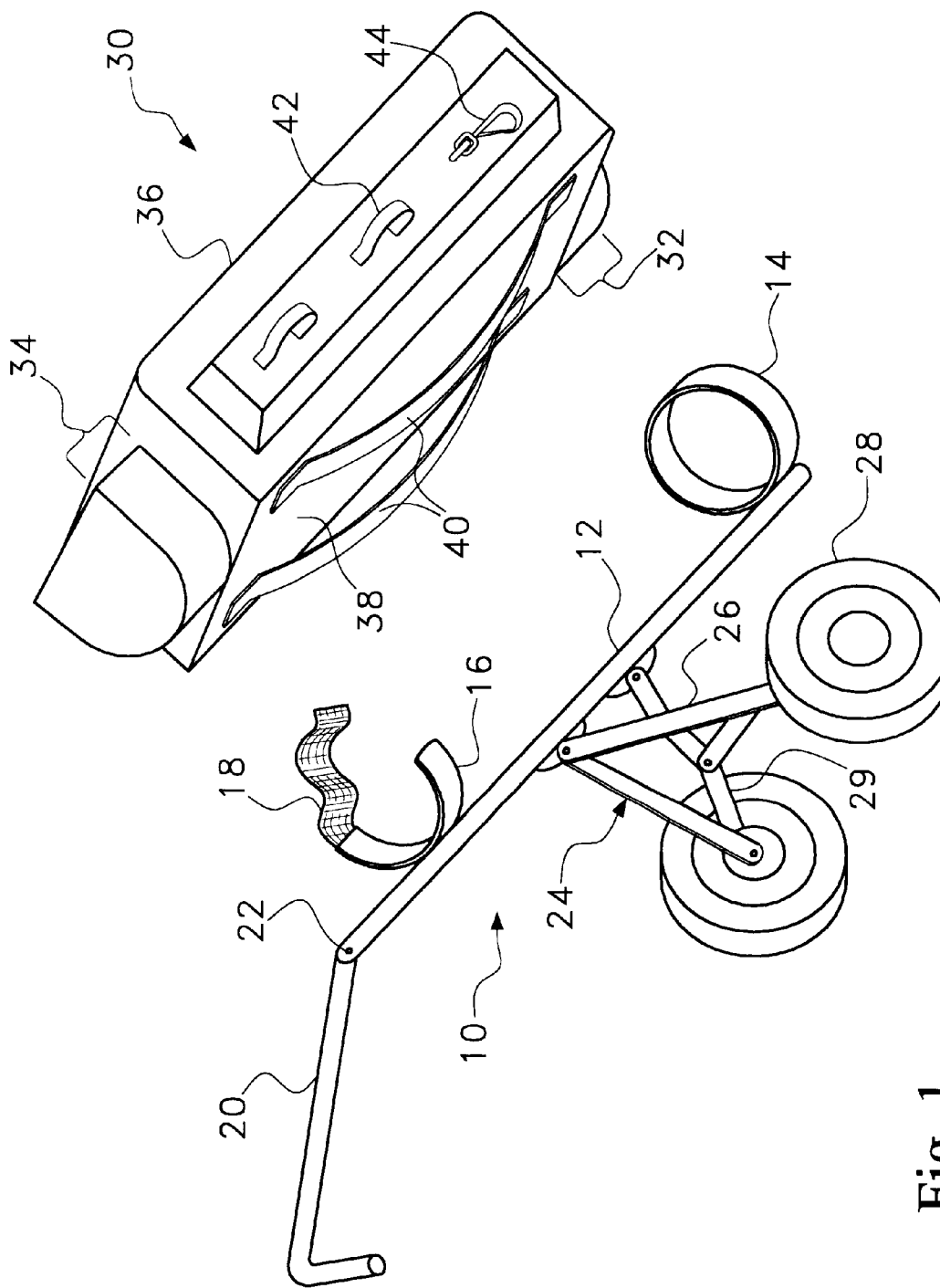
FIG. 1 is a perspective view of a carrying case in accordance with the present invention shown in conjunction with a typical prior art golf pull cart.

Referring to FIG. 1, a typical golf pull cart 10 is illustrated. The golf pull cart 10 has a primary frame element 12. At the bottom of the primary frame element 12 is an annular support 14 that is sized to accept the base of most traditional golf bags. At a point near the top of the primary frame element 12 is a semicircular support 16 that is sized to cradle a section of the upper part of a golf bag. A strap 18 is attached to the semicircular support 16. The strap 18 traverses the two ends of the semicircular support 16 and acts to retain the top of a golf bag in contact with the semicircular support 16. A handle 20 is attached to the top of the primary frame element 12 with a locking hinge 22. The handle 20 can be pivoted about the hinge 22 and laid against the primary frame element 12 when folded and not in use.

A bipod assembly 24 is also pivotably attached to the primary frame element 12. Each leg 26 of the bipod assembly 24 supports a wheel 28. The legs 26 of the bipod assembly 24 collapse together and against the primary frame element 12 when the golf pull cart 10 is collapsed and not in use. Locking guides 29 set the legs 26 of the bipod assembly 24 in place, when the golf pull cart 10 is fully deployed and in use.

Also illustrated in FIG. 1 is an exemplary embodiment of a carrying case 30 in accordance with the present invention. The carrying case 30 preferably contains at least three sections. The bottom section 32 of the carrying case 30 is generally cylindrical in shape and is sized to fit within the annular support 14 of the golf pull cart 10. The top section 34 of the carrying case 30 is sized to fit within the semicircular support 16 on the golf pull cart 10. The top section 34 is also sized to enable the strap 18 on the semicircular support 16 of the golf pull cart 10 to pass around the top section 34 of the carrying case 30 and retain that section of the carrying case in contact with the semicircular support 16. The presence of both the bottom section 32 of the carrying case 30 in the annular support 14 and the top section 34 of the carrying case 30 strapped to the semicircular support 16 firmly interconnects the carrying case 30 to the golf pull cart 10.

The middle section 36 of the carrying case 30 is enlarged and preferably has a generally flat back surface 38. Optional shoulder straps 40 are attached to the carrying case 30, wherein the shoulder straps 40 pass over the back surface 38 of the carrying case 30. The shoulder straps 40 enable the carrying case 30 to be worn as a back pack should the golf pull cart 10 be unavailable or should the terrain be incompatible with the use of a pull cart.

A plurality of straps 42 and hooks 44 are disposed on the sides of the carrying case 30. The hooks 44 and straps 42 can be used to secure large items to the carrying case 30 that are too big to fit within the carrying case 30. For example, the straps 42 can be used to secure beach umbrellas or beach chairs to the carrying case 30, while the hooks 44 can be used to secure camera bags, umbrella handles or diaper bags to the carrying case 30.

Figure 2:
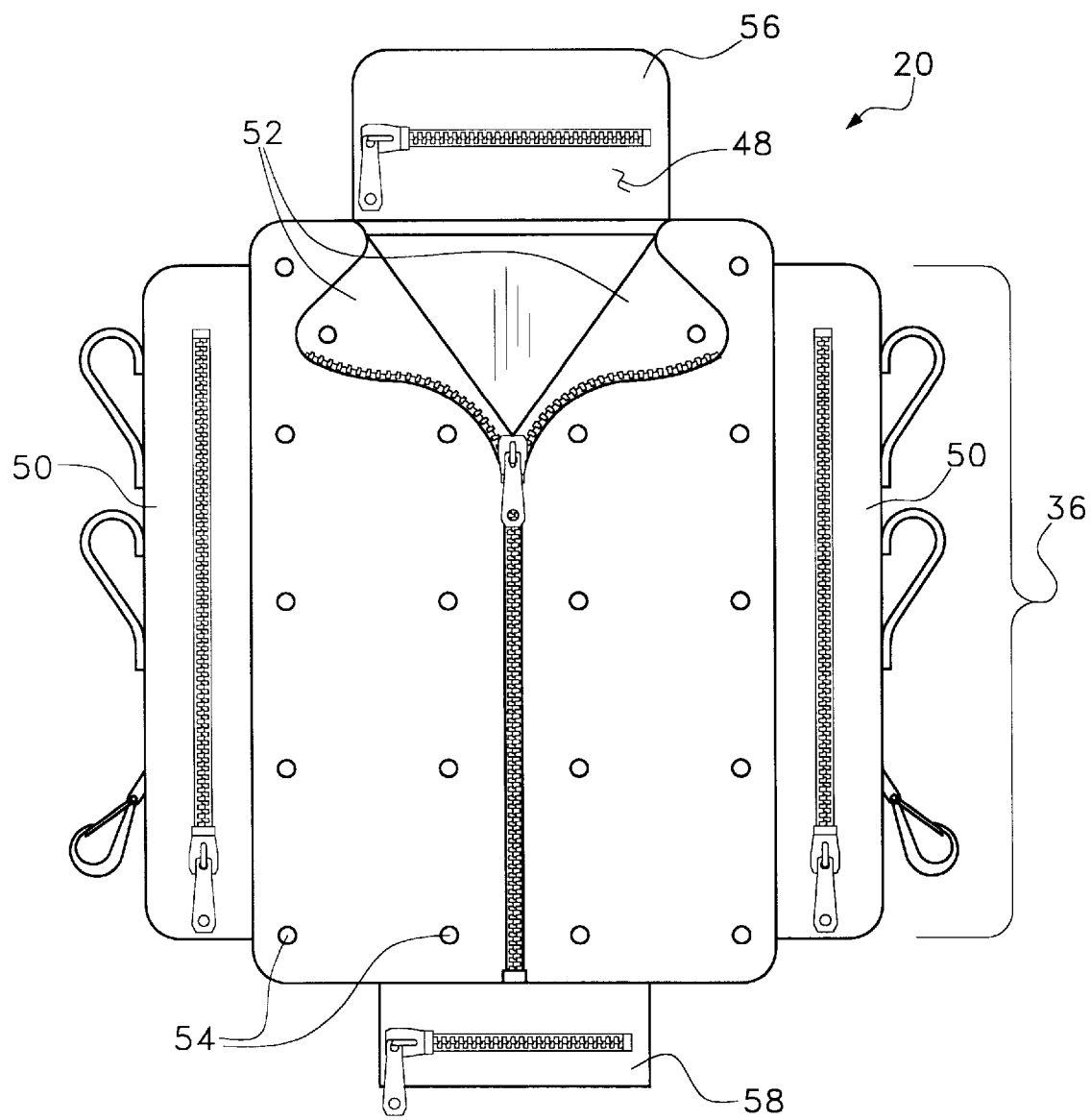
FIG. 2 is a front plan view of the carrying case shown in FIG. 1.

Referring to FIG. 2, it can be seen that the carrying case 30 contains numerous compartments and a variety of access openings to reach those compartments. Although the number size and location of the various compartments can be altered, it is preferred that the carrying case 30 have a main center compartment 48 that is disposed in the center of the middle section 36 of the carrying case 30. The central compartment 48 is accessible by two large flaps 52 that join together in a vertical line down the front of the compartment 48. Side compartments 50 are disposed on either side of the main compartment 48. Fasteners 54, such as snaps or hook and loop patches are disposed on the flaps of the main compartment. In this manner, the flaps 52 of the main compartment 48 can be retained in an open condition for a purpose which will later be explained.

In addition to the main compartment 48 and the two side compartments 50, the shown embodiment also contains an upper compartment 56 in the top section of the carrying case 30 and a lower compartment 58 in the lower section of the carrying case 30. All the compartments are accessible by at least one opening. Each opening on the carrying case 30 is preferably closable with a fastener such as a zipper, snaps, buttons, hook and loop fasteners or similar devices.

Figure 3:
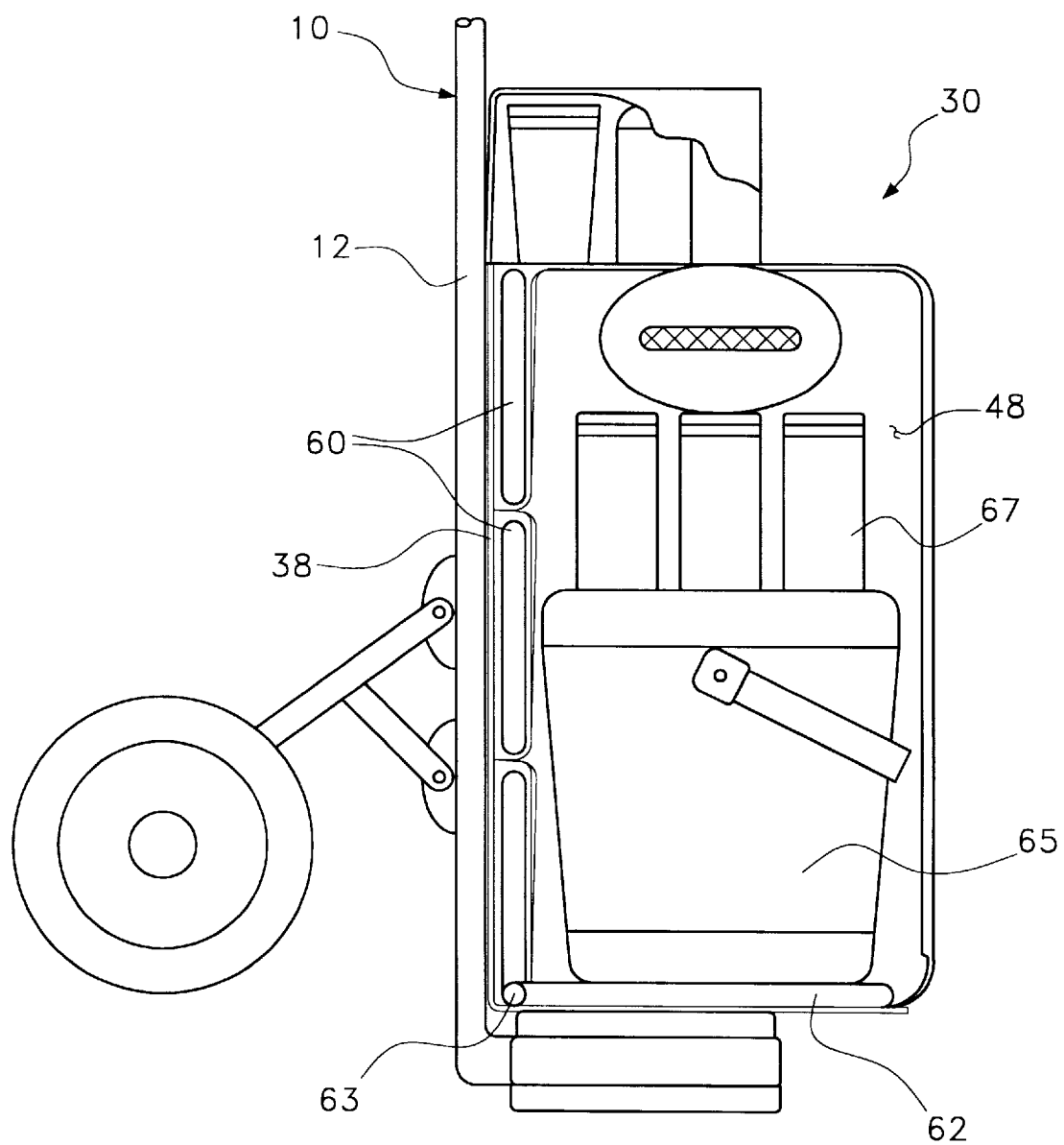
FIG. 3 is a cross-sectional view of the embodiment previously shown in FIG. 1.

Referring to FIG. 3, it can be seen that rigid or semi-rigid plates 60 are sewn into the back surface 38 of the main compartment 48. Multiple plates 60 are preferably used instead of a single plate, thereby allowing the back surface 38 of the carrying case 30 to collapse and fold when the carrying case 30 is not in use. The plates 60 can be paperboard or cardboard, but are preferably a water impervious material such as a thin sheet of plastic. The plates 60 in the back surface 38 of the main compartment 30 serve a few functions. First, the presence of the plates 60 give rigidity to the carrying case 30, thereby preventing the carrying case 30 from collapsing vertically under its own weight. Secondly, the presence of the plates 60 prevent the main frame element 12 of the golf pull cart 10 from deforming the carrying case 30 as the weight of the carrying case 30 rests against the main frame element 12. Lastly, the presence of the plates 60 in the back surface 38 of the carrying case 30 make the carrying case 30 more comfortable to wear as a backpack, should the carrying case 30 be removed from the golf pull cart 10.

A lateral platform 62 is disposed at the bottom of the main compartment 48. The lateral platform 62 is preferably coupled to the lowest plate in the back surface 38 of the carrying case 30 with a hinge 63. As such, the lateral platform 62 is free to fold up against the lower most plate when the carrying case 30 is collapsed and folded. Due to the configuration of the carrying case 30 and the hinge connection at the rear of the lateral platform 62, the lateral platform 62 comes to rest generally at a perpendicular to the plates 60 in the back surface 38 of the main compartment 48.

The lateral platform 62 serves as the main support for any heavy object that is placed in the main compartment 48 of the carrying case 30. In FIG. 3, a small cooler 65 is shown resting upon the lateral platform 62. The main compartment 48 is preferably between two and four feet high and has a floor area of between one and two square feet. This provides the main compartment 48 with a volume of between two cubic feet and eight cubic feet, which is large enough to hold a cooler 65, a case of beverage cans 67 and other heavy objects.

Figure 4:
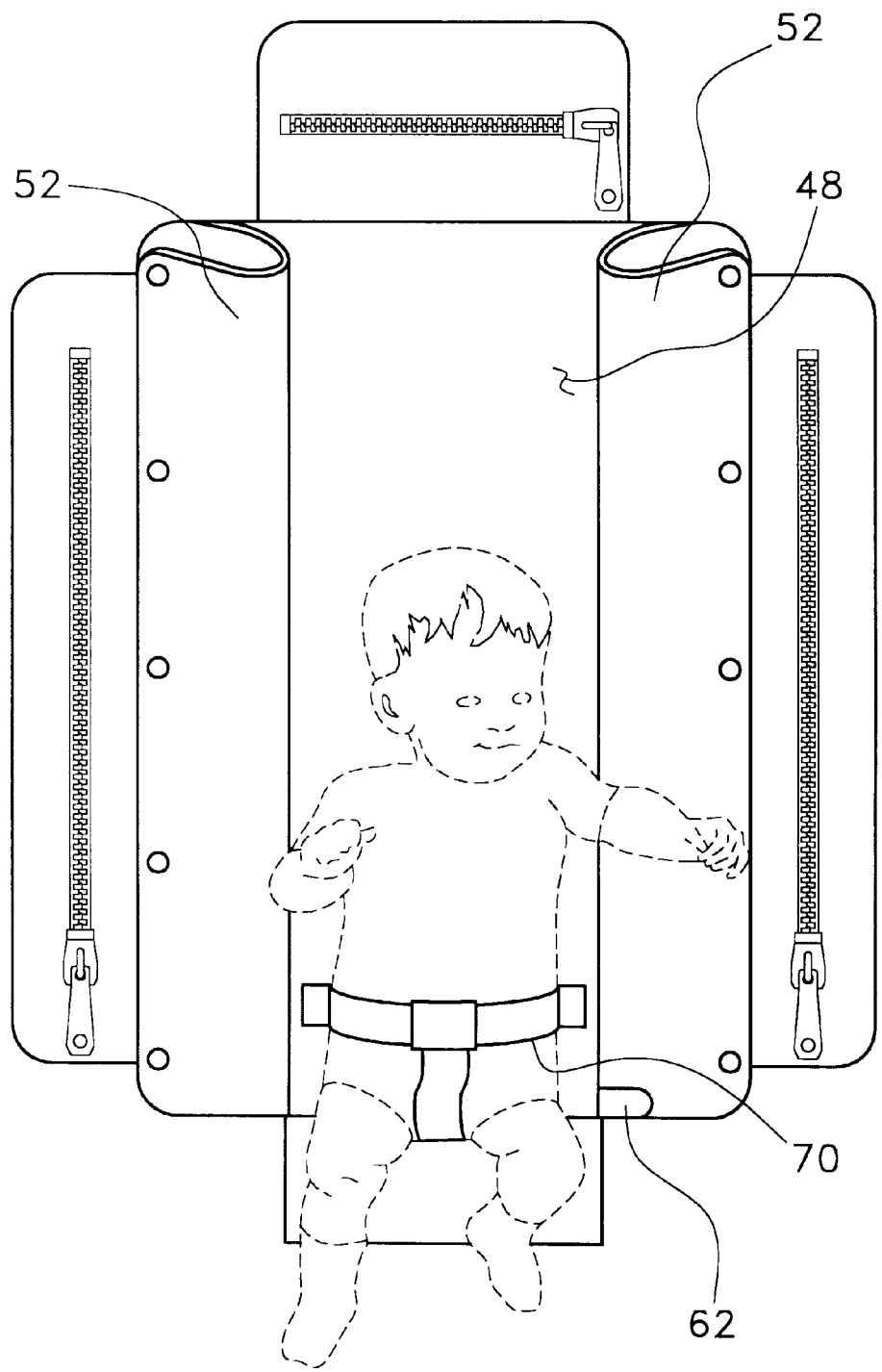
FIG. 4 is a front plan view of the embodiment of the present invention carrying case configured into a child's seat.

Referring to FIG. 4, it can be seen that the two flaps 52 covering the main compartment 48 can be opened and retained in an open position. Furthermore, an optional three point harness 70 can be positioned within the main compartment 48, wherein the three point harness 70 attaches to the lateral platform 62 and the back surface of the main compartment 48. When the flaps 52 of the main compartment 48 are opened, the main compartment 48 can be used as a child's seat. A child can sit on the lateral platform 70 with his/her back against the back surface of the main compartment 48. The three point harness 70 is then used to restrain the child in the main compartment 48. Accordingly, the assembly of the golf pull cart and the carrying case can be used as a baby stroller.

The present invention carrying case is capable of holding a large number of items both within its structure and as attachments on its exterior. By having the ability to attach to a common golf pull cart, the overall assembly provides an inexpensive alternative to dedicated travel carts. Accordingly, the present invention can be adapted for use in carrying camping equipment, beach equipment, picnic materials of just sight seeing equipment. Furthermore, the use of the carrying case/golf pull cart assembly eliminates the need of people with children to bring a separate dedicated stroller.

Some golf carts do not have annular supports at their bottoms. Rather, some golf carts only have a platform upon which the bottom of a golf bag rests. Accordingly, the present invention need not have the cylindrical bottom section previously described. Rather, the lateral platform at the bottom of the main compartment can be the lowest part of the device. The lateral platform would provide a stiff surface that can rest upon the platform of the golf cart, thereby supporting the device on the golf car.

It will be understood that the embodiments of the present invention described and illustrated herein are merely exemplary and a person skilled in the art can make many variations to the embodiment shown without departing from the scope of the present invention. It should also be understood that the various elements from the different embodiments shown can be mixed together to create alternate embodiments that are not specifically described. For example, although the golf pull cart and carrying case are shown as separate components, a person skilled in the art would know how to combine both components into a single integral assembly. All such variations, modifications and alternate embodiments are intended to be included within the scope of the present invention as defined by the appended claims.

What is claimed is:

1. A carrying case for use with a golf pull cart, wherein the golf pull cart contains a frame element, an annular support disposed at the bottom of the frame element and a semicircular support disposed proximate the top of the frame element, said carrying case comprising;

a completely enclosed main compartment having a top end, a bottom end and an access opening comprising vertical flaps, opposite a back surface and extending from a point proximate said top end to a point proximate said bottom end, wherein said main compartment has a volume of between two cubic feet and eight cubic feet with a floor area of between one and two feet square;

a generally cylindrical section extending below said main compartment, wherein said generally cylindrical section is sized to fit within the annular support on the golf pull cart;

a cylindrical a top section similar to said bottom section, extending above said main compartment, wherein said top section is sized to fit within the semicircular support on the golf pull cart.

2. The carrying case according to claim 1, wherein said main compartment has a front side surface and a rear side surface that extend between said top end and said bottom end, and wherein said access opening is disposed in said front surface.

3. The carrying case according to claim 2, further including at least one stiffening panel disposed in said rear side surface of said main compartment.

4. The carrying case according to claim 3, further including shoulder straps affixed to said rear side surface, wherein said shoulder straps enable said carrying case to be worn as a backpack.

5. The carrying case according to claim 1, further including at least one panel disposed at said bottom end of said main compartment.

6. The carrying case according to claim 4 further including a harness disposed in said main compartment for retaining a child in place sitting on said at least one panel.

7. The carrying case according to claim 1, further including at least one attachment mechanism disposed on an exterior surface of said carrying case for attaching objects to said carrying case.

8. The carrying case according to claim 7, wherein said at least one attachment mechanism is selected from a group consisting of straps, ties and hooks.

9. The carrying case according to claim 1, further including at least one secondary compartment attached to an external surface of said main compartment, wherein each of said secondary compartments contain an access opening.

10. A cart assembly, comprising:

a completely enclosed main compartment having a front surface, a back surface, side surfaces, a top end and a bottom end, wherein said enclosed main compartment defines a volume of between two cubic feet and eight cubic feet;

a child seat within said main compartment;

an access opening disposed in said front surface of said main compartment for selectively opening said front surface of said main compartment to access said child seat, wherein said access opening extends along said front surface from a point proximate said top end to a point proximate said bottom end;

a rigid panel disposed at said bottom end of said main compartment;

wheels extending from said main compartment; and a handle extending from said main compartment, wherein said main compartment can be balanced on said wheels and pulled on said wheel by said handle.

11. The assembly according to claim 10, wherein said wheels and said handle are part of a cart structure that can be selectively attached to or removed from said main compartment.

12. The assembly according to claim 11, wherein said cart structure is a golf pull cart having a frame element, an annular support disposed at the bottom of the frame element and a semicircular support disposed proximate the top of the frame element, wherein said handle and said wheels extend from said frame element.

13. The assembly according to claim 12, further including a cylindrical section disposed below said main compartment that is sized to fit within said annular support of said golf pull cart.

14. The assembly according to claim 12, further including a section above said main compartment that is sized to fit within said semicircular support of said golf pull cart.

15. The assembly according to claim 10, further including at least one attachment mechanism disposed on an exterior surface of said cart assembly for attaching objects to said cart assembly.

16. The assembly according to claim 15, wherein said at least one attachment mechanism is selected from a group consisting of straps, ties and hooks.

17. The assembly according to claim 10, further including at least one secondary compartment attached to and external surface of said main compartment, wherein each of said secondary compartments contain an access opening.

18. A carrying case for use with a golf pull cart, wherein the golf pull cart contains a frame element, a first cylindrical support disposed at the bottom of the frame element and a second cylindrical support disposed proximate the top of the frame element, said carrying case comprising;

a fully enclosed main compartment having a top end, a bottom end and an access opening having flaps and extending from a point proximate said top end to a point proximate said bottom end;

at least one panel disposed at said bottom end of said main compartment;

a harness disposed in said main compartment for retaining a child in place sitting on said at least one panel;

a bottom section extending below said main compartment, wherein said bottom section is sized to fit on the first support on the golf pull cart;

a top section extending above said main compartment, wherein said top section is sized to fit within the second support on the golf pull cart.

* * * * *